(12) United States Patent
Allen et al.

(10) Patent No.: US 7,280,502 B2
(45) Date of Patent: Oct. 9, 2007

(54) METHOD FOR A SESSION INITIATION PROTOCOL PUSH-TO-TALK TERMINAL TO INDICATE ANSWER OPERATING MODE TO AN INTERNET PROTOCOL PUSH-TO-TALK NETWORK SERVER

(75) Inventors: Andrew M. Allen, Mundelein, IL (US); Adrian Buckley, Tracy, CA (US); Bokinakere S. Sundresh, Basingstoke (GB)

(73) Assignee: Research In Motion Limited, Waterloo, Ontario (CA)

( * ) Notice: Subject to any disclaimer, the term of this patent is extended or adjusted under 35 U.S.C. 154(b) by 385 days.

(21) Appl. No.: 11/104,385

(22) Filed: Apr. 12, 2005

(65) Prior Publication Data

US 2005/0255811 A1    Nov. 17, 2005

Related U.S. Application Data

(60) Provisional application No. 60/620,034, filed on Oct. 19, 2004, provisional application No. 60/561,664, filed on Apr. 13, 2004.

(51) Int. Cl.
*H04B 7/00* (2006.01)
(52) U.S. Cl. ...................................... 370/329; 455/519
(58) Field of Classification Search ................ 370/329, 370/342; 455/518, 519
See application file for complete search history.

(56) References Cited

U.S. PATENT DOCUMENTS

| 6,240,391 | B1 | 5/2001 | Ball et al. | |
|---|---|---|---|---|
| 6,477,150 | B1 | 11/2002 | Maggenti et al. | |
| 6,564,261 | B1 | 5/2003 | Gudjonsson et al. | |
| 6,584,490 | B1 | 6/2003 | Schuster et al. | |
| 6,671,370 | B1 | 12/2003 | Heinonen et al. | |
| 6,751,468 | B1* | 6/2004 | Heubel et al. | 455/518 |
| 2002/0037735 | A1* | 3/2002 | Maggenti et al. | 455/517 |
| 2003/0053434 | A1 | 3/2003 | Chow et al. | |
| 2003/0058827 | A1 | 3/2003 | Chow et al. | |
| 2003/0190888 | A1 | 10/2003 | Mangal et al. | |
| 2004/0224710 | A1* | 11/2004 | Koskelainen et al. | 455/518 |
| 2004/0266468 | A1* | 12/2004 | Brown et al. | 455/518 |
| 2005/0143111 | A1* | 6/2005 | Fitzpatrick et al. | 455/518 |
| 2005/0143135 | A1* | 6/2005 | Brems et al. | 455/564 |
| 2005/0169223 | A1* | 8/2005 | Crocker et al. | 370/342 |
| 2006/0094455 | A1* | 5/2006 | Hannu et al. | 455/518 |
| 2006/0116151 | A1* | 6/2006 | Sullivan et al. | 455/519 |

OTHER PUBLICATIONS

Ericsson et al., "Push to Talk over Cellular (PoC); List Management and Do-not-Disturb; PoC Release 1.0", Aug. 2003, 53 pp.

(Continued)

*Primary Examiner*—Edward F. Urban
*Assistant Examiner*—Adeel Haroon
(74) *Attorney, Agent, or Firm*—Kirk D. Houser; Brij K. Agarwal; Eckert Seamans Cherin & Mellott, LLC

(57) ABSTRACT

A push-to-talk communication device including an operating answer mode indicates that operating answer mode to a Session Initiation Protocol/Internet Protocol based push-to-talk network server. The method includes employing as the operating answer mode of the push-to-talk communication device one of an automatic-answer mode, an always-automatic-answer mode and a manual-answer mode. A Session Initiation Protocol/Internet Protocol core network is employed including a Session Initiation Protocol/Internet Protocol push-to-talk network server. The operating answer mode is indicated in a Session Initiation Protocol message from the push-to-talk communication device to the Session Initiation Protocol/Internet Protocol push-to-talk network server over the Session Initiation Protocol/Internet Protocol core network.

17 Claims, 10 Drawing Sheets

OTHER PUBLICATIONS

Schuelke, Anett, "Availability Control Function", Jan. 29, 2004, 7 pp.

3GPP Organizational Partners, "3rd Generation Partnership Project; Technical Specification Group Services and System Aspects; 3GPP enablers for OMA PoC Services; Stage 2 (Release 6)", Mar. 2004, 10 pp.

Open Mobile Alliance Ltd., "Push to talk over Cellular (PoC)—Architecture", Feb. 4, 2004, 77 pp.

Rosenberg, J. et al., "Session Initiation Protocol (SIP) Extensions for Presence", May 20, 2002, 26 pp.

Rosenberg, J., "A Session Initiation Protocol (SIP) Event Package for Registrations", May 28, 2002, 24 pp.

Roach, A.B., "Session Iniation Protocol (SIP)-Specific Event Notification", Jun. 2002, 38 pp.

Garcia-Martin, M., "A Session Initiation Protocol (SIP) Event Package and Data Format for Incoming Session Barring and Answer Mode in support for the Push-to-talk Over Cellular (PoC) service", Oct. 18, 2004, 18 pp.

MOBILEIN.COM, "Push-to-Talk", http://www.mobilein.com/push_to_talk.htm, 2001-2004, pp. 1-4.

3Gwww.3G.co.uk, "3GPP IMS Push to Talk", http://www.3g.co.uk/PR/Sept2003/5820.htm, Sep. 11, 2003, pp. 1-3.

G. Afansev and G. Lesch, TelephonyOnline, "Ready for Prime Time", http://telephonyonline.com/ar/telecom_ready_prime_time_2/, Jan. 7, 2004, pp. 1-4.

NOKIA, White Paper, Push to Talk over Cellular—Real-time always-on voice service, 2003, pp. 1-12.

\* cited by examiner

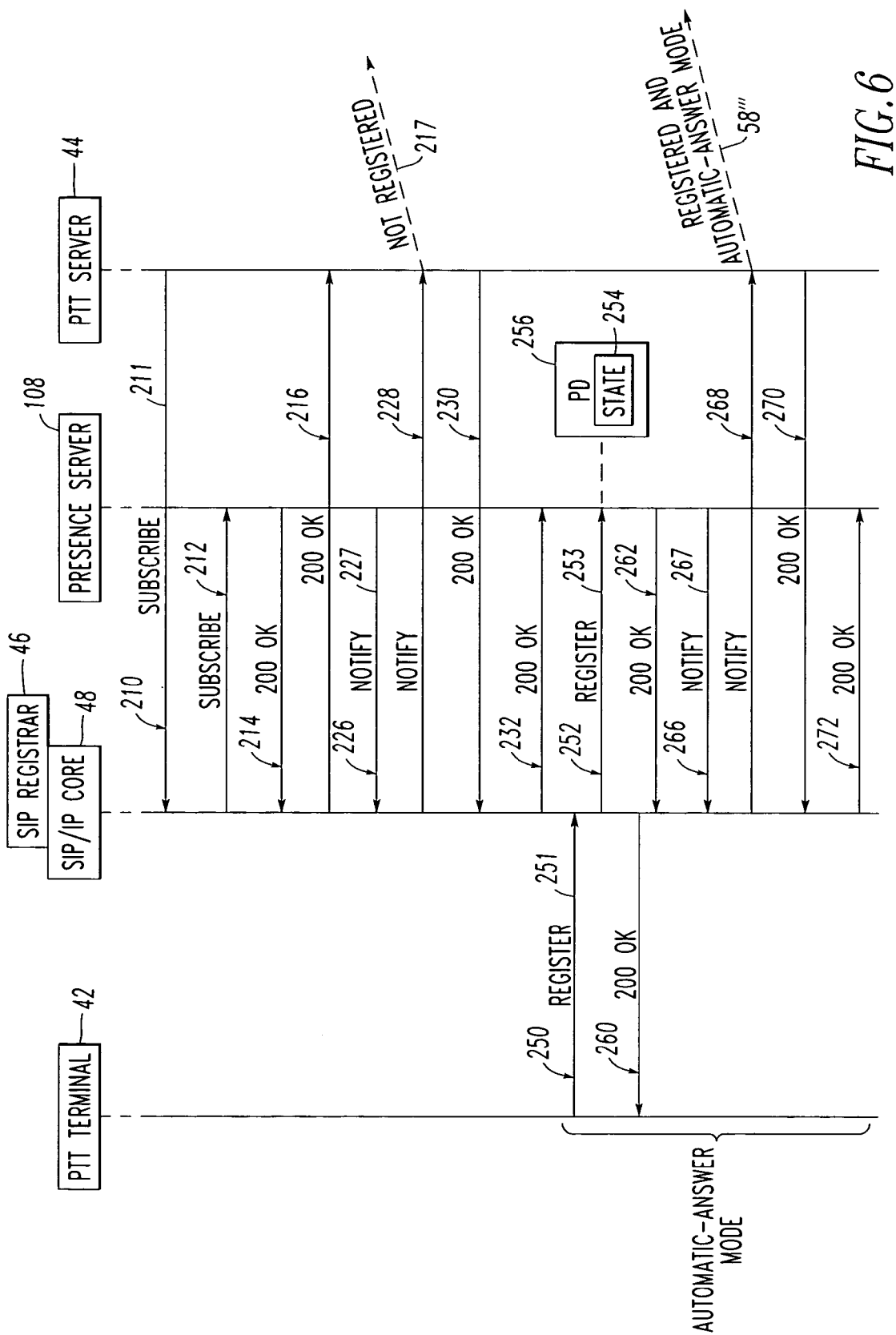

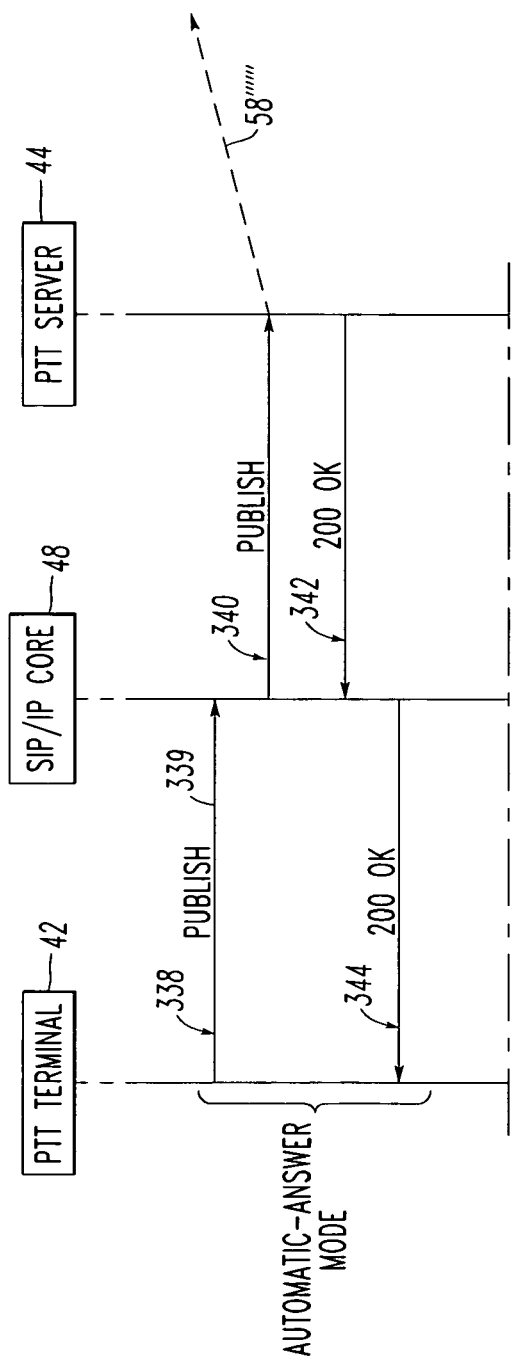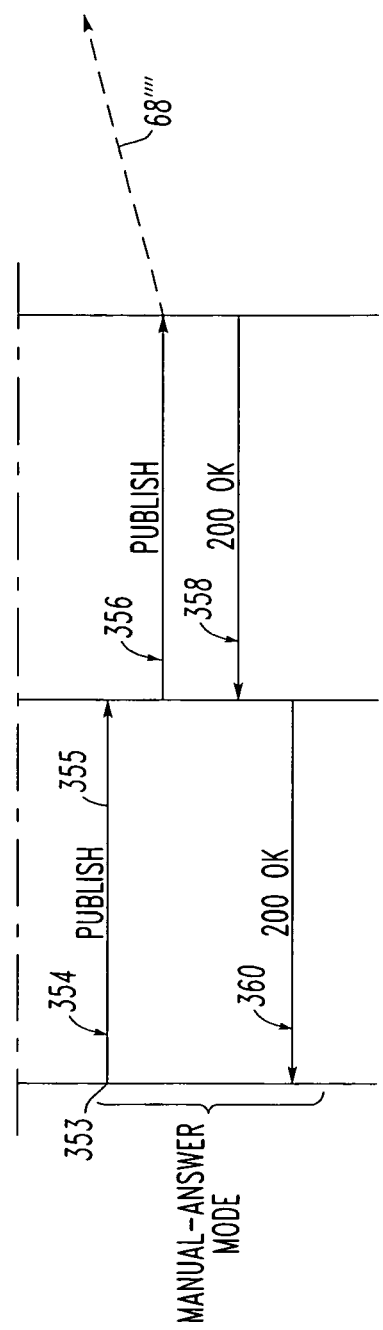

METHOD FOR A SESSION INITIATION PROTOCOL PUSH-TO-TALK TERMINAL TO INDICATE ANSWER OPERATING MODE TO AN INTERNET PROTOCOL PUSH-TO-TALK NETWORK SERVER

CROSS REFERENCE TO RELATED APPLICATIONS

This application claims the benefit of U.S. Provisional Patent Application Ser. No. 60/561,664, filed Apr. 13, 2004; and of U.S. Provisional Patent Application Ser. No. 60/620,034, filed Oct. 19, 2004.

BACKGROUND OF THE INVENTION

1. Field of the Invention

This invention pertains generally to methods of communication between communication devices and, more particularly, to a method and apparatus for providing push-to-talk (PTT) communication services in a communication system such as, for example, a cellular telephone system.

2. Background Information

A wireless push-to-talk (PTT) communication system such as, for example, a push-to-talk over cellular (PoC) system, allows a group of individuals, each having a wireless communication device, such as a cellular telephone, to communicate with other members of the group. Early PTT systems typically relied on a single frequency, or a dedicated broadcast channel, over which communications were received by the wireless communication devices. In most early systems, only one member could transmit information to the other members at a time. However, all members could listen to the dedicated channel, in order to receive communications from the member who is transmitting. A member desiring to transmit to other members of the system typically would send an access request by depressing a PTT button on the member's wireless communication device, which allows sole access to the dedicated channel.

Internet telephony encompasses a number of technologies for the transport of voice traffic over Internet Protocol (IP) networks. Examples of IP signaling protocols include the International Telecommunications Union-Telecommunications Standardization Sector (ITU-T) H.323 and the Internet Engineering Task Force (IETF) specified Session Initiation Protocol (SIP), RFC 3261, which is used as the signaling protocol for the 3GPP IP multimedia subsystem (IMS). Wireless communication devices find, join, leave and learn about various groups of people requiring communications with each other (e.g., nets) using, for example, SIP, which is a well-known signaling protocol used in the telecommunications industry. SIP is an application-layer control (signaling) protocol for creating, modifying and terminating sessions with one or more users. These sessions include, for example, Internet telephone calls, multimedia distribution and multimedia conferences.

One SIP function is registration between a SIP uniform resource identifier (i.e., a sequence of characters employed for addressing resources and users for transmission in a network protocol and for representation of human language communication, e.g., a SIP:URI) and one or more contact addresses (e.g., a device address, such as an IP address). Registration permits a wireless communication device to communicate with and be recognized by other wireless communication devices. SIP, through its registration function, permits a user agent to create, modify and delete registrations. Basic registration includes the address-of-record that the registration refers to, identification of registration and state of registration. The registration states may be initialized, activated and terminated. As long as there is at least one contact bound to the address-of-record, a SIP state machine remains in its active state. When the last contact expires or is removed, the registration transitions to the terminated state. The registration state is normally stored in a proxy/registrar or in a separate database. When the SIP wireless communication device is continuously on, it must be continuously registered to the SIP/IP network if it is to use the services of the 3GPP IMS SIP based network. Registrations may be used by policy administrators to terminate or shorten a registration, and to request that the wireless communication device re-register, in order that it can be re-authenticated.

A SIP PTT wireless communication device or PTT terminal may support different operating answer modes including an Auto-Answer mode and a Manual-Answer mode. For example, when a PTT terminal is in the Auto-Answer mode, then when another user in the corresponding net/group presses a PTT button on their PTT terminal and speaks into that PTT terminal, the other user(s) with PTT terminals set to the Auto-Answer mode hear that spoken voice from their PTT terminal(s). Alternatively, when a PTT terminal is in the Manual-Answer mode, the other user(s) of that PTT terminal must manually answer (e.g., there is first a "ring" at the PTT terminal(s)) before hearing that spoken voice. A further enhancement to this basic concept is the use of network stored Authorization Accept Lists with per user authorization of the operating answer mode for PTT sessions from each user (some users may have only Manual-Answer privilege, while other users may have Auto-Answer privilege). When used with per user authorization, the handling for the PTT session is determined by a combination of the calling user's Authorization privilege on the Accept List and the operating answer mode set by the terminal. There are, therefore, two possible cases for Auto-Answer: (1) Auto-Answer mode where only those users that have Auto-Answer privilege on the Accept List cause the terminal to answer automatically; and (2) Always-Auto-Answer mode where all users on the Accept List, regardless of privilege, cause the terminal to answer automatically. The terminal may support one or two or all three of these operating modes. The operating answer mode may be selected by the user at the PTT terminal by employing, for example, a physical switch or button, one or more settings of an enabled profile, or by some other suitable mechanism. Since the operating answer mode changes the network signaling scenario of the SIP/IP PTT network server that controls the setup of SIP PTT sessions, this mode of the SIP PTT terminal needs to be communicated to the network server.

FIG. 1 shows a SIP/IP core network 1 including a PTT server 2, a presence server 3 and a plurality of SIP PTT terminals 4,5,6. Although wireless SIP PTT terminals 4,5,6 are shown, wire line (e.g., land line-based or local area network (LAN) based) PTT terminals (not shown) may be employed.

A PTT terminal, such as 4, may typically include an optional antenna 8, an optional display 9, a plurality of keys 10, a mouthpiece or microphone 11, an earpiece, earphone, headset or loudspeaker 12, and a PTT switch 13. Alternatively, one of the existing keys 10 or selection of a displayed menu option may function as a PTT switch when in a PTT mode of communication instead of using the dedicated PTT switch 13.

In the SIP/IP core network 1, group creation is possibly based on HTTP and XCAP, and signaling control is based upon SIP. Voice traffic is carried out through a suitable Internet protocol, such as Real-time Transport Protocol (RTP), which is designed to provide end-to-end network transport functions for applications transmitting real-time data, such as voice and video. Both SIP and RTP sit at the top of an IP related stack including UDP and IP layers. A plurality of suitable PoC applications form the top layer of a PoC protocol stack, which includes that IP related stack. A suitable mobile channel, such as 3GPP R99 upgraded GPRS or E-GPRS or W-CDMA/UMTS, or CDMA 2000 1X or its variants, WLAN access or other 3G radio access technologies, provides the access network, which supports header compression and streaming traffic class Quality of Service (QoS).

A Header is a component of a SIP message, such as 14, that conveys information about the message. It is structured as a sequence of header fields.

A header field is a component of a SIP message header. A header field can appear as one or more header field rows. Header field rows consist of a header field name and zero or more header field values. Multiple header field values on a given header field row are separated by commas. Some header fields can only have a single header field value, and as a result, always appear as a single header field row.

A Header Field Value is a single value. A header field consists of zero or more header field values.

A Message is data sent between SIP elements, such as 2-7, as part of the SIP protocol. SIP messages 14,15,16 are either requests or responses.

A Request, such as 14,15, is a SIP message sent from a client to a server, for the purpose of invoking a particular operation.

A Response, such as 16, is a SIP message sent from a server to a client, for indicating the status of a request sent from the client to the server.

A Server, such as 2,3,7, is a network element that receives requests in order to service them and sends back responses to those requests. Examples of servers are proxies, user agent servers, redirect servers and registrars.

The network-based PTT server 2 receives invitations for group communication from one user. In response, the server 2 invites all the other members of the group to the communication, controls the "floor" (e.g., the right to speak), bridges the communication between all the members of the net/group, and needs to know the current answer mode of the SIP PTT terminals 4,5,6 for proper signaling conditions, and communication media handling.

The network-based presence server 3 stores Presence Information published by the individual SIP PTT terminals 4,5,6, and also possibly other network based sources (e.g., servers, such as 2,7) and delivers Notifications of Presence Information to authorized watchers who subscribe to the Presence Information using their terminals.

The SIP registrar 7 is a server that accepts SIP Register requests and places the information it receives in those requests into the location service database for the domain it handles.

There is one known prior proposal for dealing with an answering mode setting in a PoC SIP/IP core network. In addition to accept control lists, the PoC system has an auto-answer mode flag, which can be set on a user and/or a group basis. The auto-answer mode flag is stored in a Group Management Server (GLMS) (not shown) in a Group Management database that is accessed by the PoC PTT server 2. The user has the ability to configure the corresponding PTT terminal, such as 4, to either automatically accept the incoming session request or to be prompted before accepting the request. In the simplest case, if the user sets auto-answer mode on, then the auto-answer mode is applied to the incoming PoC sessions. Otherwise, if the auto-answer mode is off, then the manual-answer mode is applied.

It is believed that this prior proposal is inappropriate because: (1) modifying data in the GLMS requires use of an HTTP database modification protocol; (2) the change of answer mode may be made, for example, by a switch or by selection of a profile, which does not map well to a database manipulation (e.g., this requires a high degree of complexity in the terminal to synchronize with and manipulate a database in response to a simple stimulus like a switch; also, the database manipulation protocol may not be supported by all terminals as the individual users may not have the authorization to manipulate their own group and authorization lists, since their company controls this; further, a simple telephone keypad is not ideal for entering and creating a large list of text based information); and (3) depending upon the user, the answer mode may change many times a day (e.g., it is relatively very dynamic), while data (e.g., address book entries; preferences for those users) stored in the GLMS hardly ever is changed (e.g., it is relatively almost static). The IETF has defined this division of relatively static and relatively dynamic data as "Hard State" and "Soft State," respectively. Different protocol mechanisms are appropriate to manipulate Hard State and Soft State data. The answer mode is considered as Soft State, the manipulation of groups and lists in a database is considered Hard State.

Hence, it is believed that it is more efficient than employing an HTTP mechanism to simply report the answer mode state change/event to the network. Accordingly, there is room for improvement in wireless PTT systems and methods.

SUMMARY OF THE INVENTION

These needs and others are met by the invention, which provides a method for a push-to-talk (PTT) communication device including an operating mode to indicate that operating mode to a push-to-talk network server.

As one aspect of the invention, a method for a push-to-talk communication device including an operating mode to indicate the operating mode to a push-to-talk network server comprises: employing as the operating mode of the push-to-talk communication device one of a first answer mode and a second answer mode; employing a communication network including a push-to-talk network server; and indicating the operating mode in a Session Initiation Protocol message from the push-to-talk communication device to the push-to-talk network server over the communication network.

The method may further comprise employing as the first answer mode an automatic-answer mode; employing as the second answer mode a manual-answer mode; employing as the communication network an Internet Protocol core network; and employing as the push-to-talk network server an Internet Protocol push-to-talk network server.

As another aspect of the invention, a method for a push-to-talk communication device including an operating mode to indicate the operating mode to a push-to-talk network server comprises: employing as the operating mode of the push-to-talk communication device one of a first answer mode, a second answer mode and a third answer mode; employing a communication network including a push-to-talk network server; and indicating the operating mode in a Session Initiation Protocol message from the push-to-talk communication device to the push-to-talk network server over the communication network.

The method may employ as the first answer mode an automatic-answer mode; employ as the second answer mode an always-automatic-answer mode; employ as the third answer mode a manual-answer mode; employ as the communication network an Internet Protocol core network; and employ as the push-to-talk network server an Internet Protocol push-to-talk network server.

As another aspect of the invention, a method for a push-to-talk communication device including an operating mode to send the operating mode to a push-to-talk network server comprises: employing as the operating mode of the push-to-talk communication device one of at least a first answer mode and a second answer mode; employing a communication network including a push-to-talk network server; and sending the operating mode in an event reporting message from the push-to-talk communication device or from another device on behalf of the push-to-talk communication device to the push-to-talk network server over the communication network.

BRIEF DESCRIPTION OF THE DRAWINGS

A full understanding of the invention can be gained from the following description of the preferred embodiments when read in conjunction with the accompanying drawings in which:

FIGS. 6-8 and 9A-9B are message diagrams in accordance with other embodiments of the invention.

DESCRIPTION OF THE PREFERRED EMBODIMENTS

As employed herein, the terms "indicate" and "indicating" shall expressly include, but not be limited by, notify and notifying, publish and publishing, and register and registering.

As employed herein, the term "wireless communication device" shall expressly include, but not be limited by, a cellular telephone, a mobile telephone, a wireless push-to-talk (PTT) terminal, a mobile electronic communication device, and a wireless handheld electronic device including, for example, a wireless local area network (WLAN) terminal.

As employed herein, the term "PTT terminal" shall expressly include, but not be limited by, a wireless PTT terminal, and a wire line PTT terminal.

As employed herein, the term "event reporting message" means a message that reports an event or state change in an entity. The event reporting message may be sent to another entity as a notification in response to a subscription by the other entity to receive notifications concerning the subscribed to event (e.g., without limitation, a SIP Notify method) or may be pushed or published asynchronously to another entity (e.g., without limitation, a SIP Publish method).

As employed herein, the term "event package" means a specification which defines a set of state information to be reported by a notifying entity to another entity. Event packages define the syntax and semantics to convey such state information.

As employed herein, the term "XML" means Extensible Markup Language.

The invention is described in association with Session Initiation Protocol (SIP) push-to-talk (PTT) over cellular (PoC) networks, although the invention is applicable Internet Protocol (IP) core networks.

Figure 1:
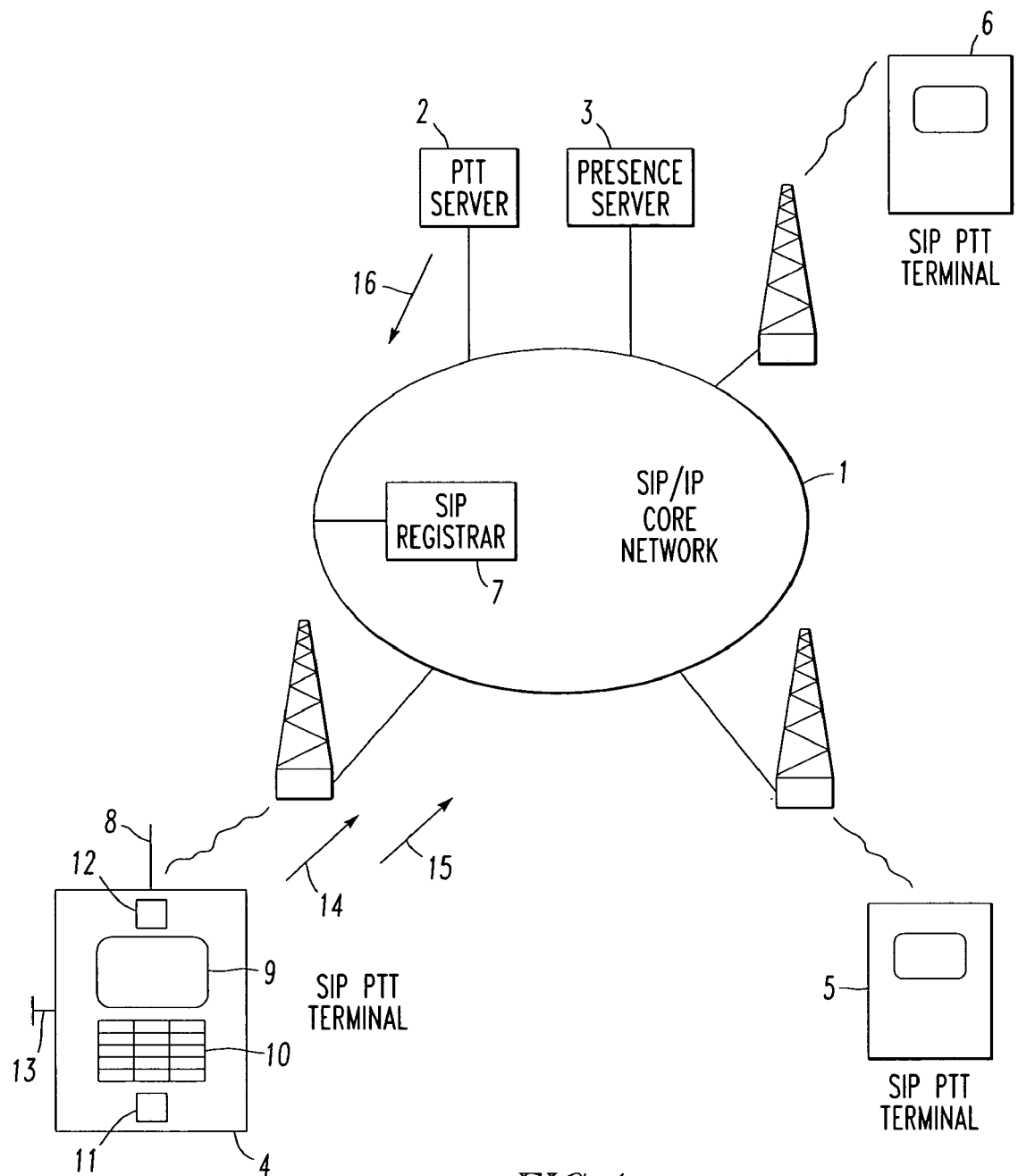
FIG. 1 is a block diagram of an Internet Protocol (IP) core network, such as a Session Initiation Protocol (SIP)/IP push-to-talk (PTT) over cellular (PoC) network, including a PTT server, a presence server and a plurality of SIP PTT terminals, such as SIP PTT capable cellular telephones.
Figure 2:
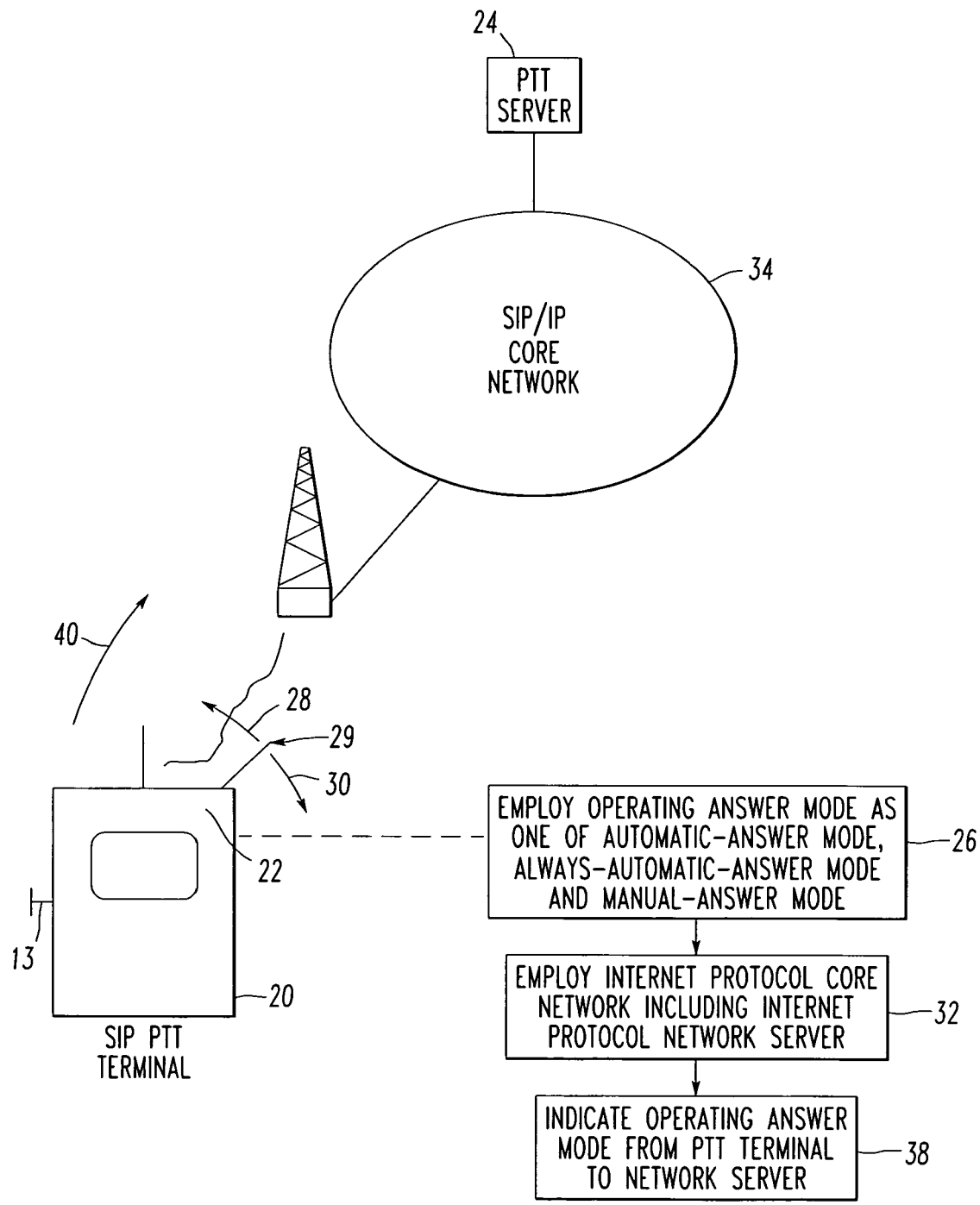
FIG. 2 is a flowchart of a method for a PTT terminal including an operating answer mode to indicate that mode to an Internet Protocol push-to-talk network server.

FIG. 2 shows a method for a SIP PTT terminal 20 including an operating answer mode 22 to indicate that operating answer mode to an Internet Protocol PTT network server 24. The method includes employing, at 26, the operating answer mode 22 as one of an automatic-answer mode 28, an always-automatic-answer mode 29 and a manual-answer mode 30. Next, at 32, a Session Initiation Protocol/Internet Protocol core network 34 is employed including the Internet Protocol PTT network server 24. Finally, at 38, the operating mode 22 is indicated in a Session Initiation Protocol message, at 40, from the SIP PTT terminal 20 to the Internet Protocol based PTT network server 24 over the Session Initiation Protocol/Internet Protocol core network 34.

Figure 3:
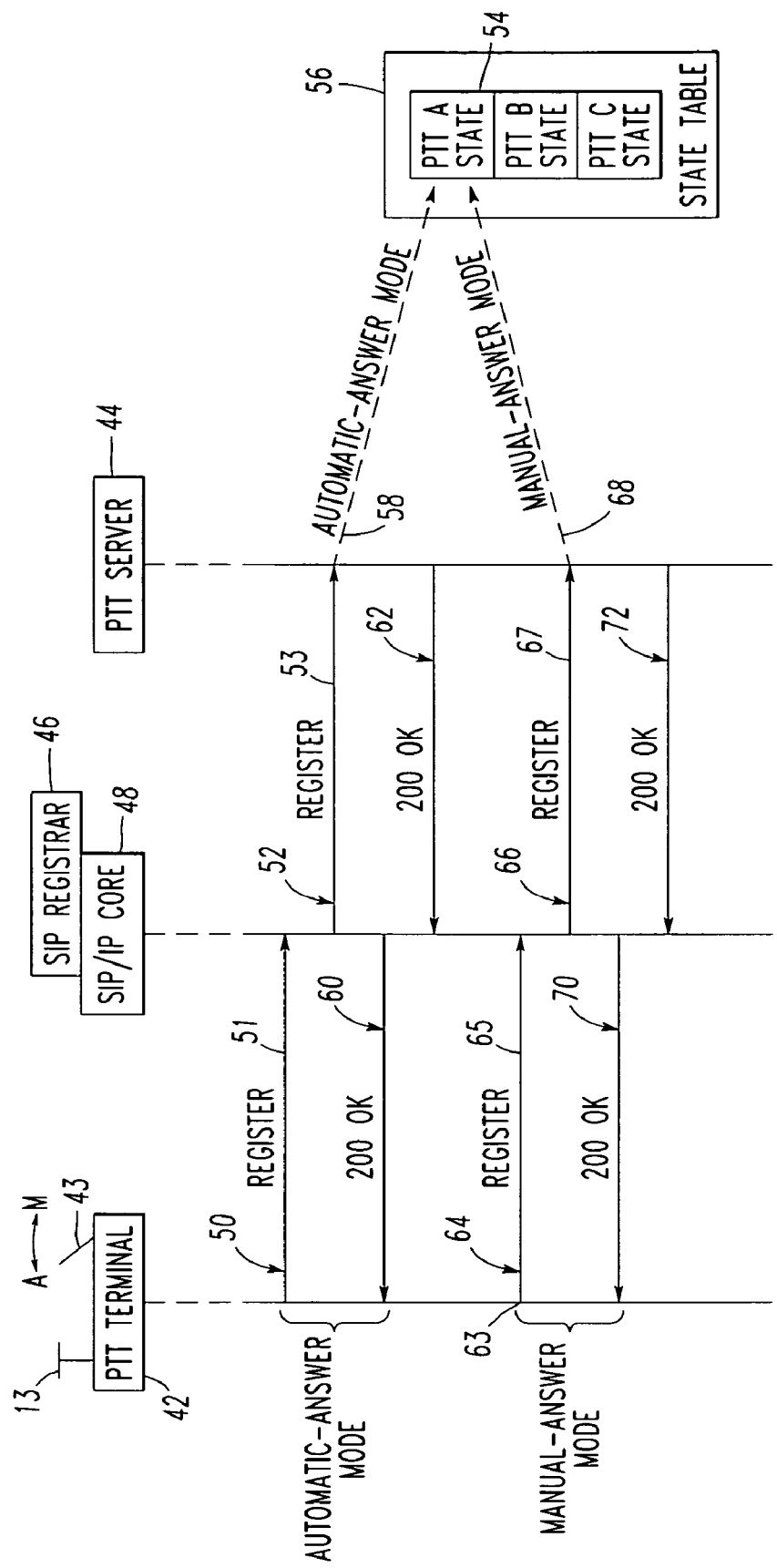
FIG. 3 is a message diagram in accordance with an embodiment of the invention.

FIG. 3 shows a message diagram for changing the operating mode of a PTT terminal 42, including the PTT switch 13 and an Auto/Manual toggle switch 43, at a PTT server 44. SIP supports the capability of a PTT terminal, such as 42, to indicate the features that it supports in a SIP Register request, such as 50, using a SIP Contact header, such as 51, by extending the feature-param of the contact header field. Feature tags may begin with a plus sign for tags that are user defined extensions. A suitable mechanism is shown in Table 1:

TABLE 1

| | |
|---|---|
| feature-param = | enc-feature-tag [EQUAL LDQUOT (tag-value-list / string-value ) RDQUOT] |
| enc-feature-tag = | base-tags / other-tags |
| base-tags = | "audio" / "automata" / "class" / "duplex" / "data" / "control" / "mobility" / "description" / "events" / "priority" / "methods" / "schemes" / "application" / "video" / "language" / "type" / "isfocus" / "actor" / "text" |
| other-tags = | "+" ftag-name |
| ftag-name = | ALPHA *( ALPHA / DIGIT / "!" / "'" / "." / "-" / "%" ) |
| tag-value-list = | tag-value *("," tag-value) |
| tag-value = | ["!"] (token-nobang / boolean / numeric) |
| token-nobang = | 1*(alphanum /"-" / "." / "%" / "*" / "_" / "+" /"`" / "'" / "~") |
| boolean = | "TRUE" / "FALSE" |
| numeric = | "#" numeric-relation number |
| numeric-relation = | ">=" / "<=" / "=" / (number ":") |
| number = | [ "+" / "−" ] 1*DIGIT ["." 0*DIGIT] |
| string-value = | "<" qdtext ">" | wherein:
EQUAL is "=";
LDQUOT is "'";
RDQUOT is "'";
ALPHA is a, b, c, d, . . . z;
DIGIT is 0, 1, 2, 3, . . . 9;
"*" means any number of them;
"/" means alternative (e.g., X / Y means X or Y); and feature-param is an feature parameter that describes a feature of the user agent associated with the uniform resources indicator in the contact header field. Feature parameters are identifiable because they either belong to the well known set of base feature tags, or they begin with a plus sign.

This mechanism provides for the enc-feature-tag of the feature-param to be extended. An enc-feature-tag is included as part of the SIP Contact header 51 that indicates the current operating mode of the PTT terminal 42. For example, +poc.operating.mode="Auto," may be employed to indicate that the switch 43 of the PTT terminal 42 is in Automatic-Answer Mode (A). The PTT terminal 42 may include this feature-param in the contact header during each SIP registration. If the mode of the PTT terminal 42 is changed by the user, then the PTT terminal 42 refreshes its registration including the feature-param with the new value in the contact header of the SIP register request. The SIP PTT server 44 that controls the setup of PTT sessions needs to obtain the registration information from the SIP registrar 46 in the SIP/IP core 48, in order to obtain the operating mode of the PTT terminal 42.

FIG. 3 shows two groupings of SIP messages 50,52,60,62 and 64,66,70,72 associated with the Automatic-Answer Mode 58 and Manual-Answer Mode 68, respectively, of the PTT terminal 42. First, the PTT terminal 42 Registers with the SIP/IP core 48 in Automatic-Answer Mode by sending the SIP Register request 50 to the SIP/IP core 48 containing the Contact header 51 with a feature-param of +poc.operating.mode="Auto". The SIP registrar 46 in the SIP/IP core 48 is configured to perform third party registrations with the PTT server 44 when the PTT terminal 42 registers. The SIP registrar 46 in the SIP/IP core 48 sends a SIP Register request 52 to the PTT server 44 containing a Contact header 53 with the feature-param of +poc.operating.mode="Auto". In response, the PTT server 44 sets the state 54 (e.g., PTT A state) of the corresponding PTT terminal 42 in its state table 56 (e.g., also including PTT B and PTT C states for other PTT terminals (not shown)) to Automatic-Answer Mode 58. Then, the SIP registrar 46 in the SIP/IP core 48 responds to the SIP Register request 50 with a SIP 200 OK response 60 to the PTT terminal 42. Finally, the PTT server 44 responds to the SIP Register request 52 with a SIP 200 OK response 62 to the SIP registrar 46 in the SIP/IP core 48.

EXAMPLE 1

An example SIP Register request sent by the PTT terminal 42 to indicate Automatic-Answer Mode is as follows:
REGISTER sip:example.com SIP/2.0
From: sip:POCuser@example.com;tag=asd98
To: sip:POCuser@example.com
Call-ID: hh89as0d-asd88jkk@host.example.com
CSeq: 9987 REGISTER
Max-Forwards: 70
Via: SIP/2.0/UDP POChost.example.com; branch=z9hG4bKnashds8
Contact: <sip:POCuser@host.example.com>;audio ;+poc.operating.mode="Auto";mobility="mobile"; methods="INVITE,BYE,OPTIONS,ACK,CANCEL"
Content-Length: 0

At 63, the user switches the PTT terminal 42 from Automatic-Answer Mode to Manual-Answer Mode by employing the Auto/Manual toggle switch 43 to select the Manual-Answer Mode (M). This triggers a refresh Registration by the PTT terminal 42. Alternatively, any suitable physical switch or button (not shown), one or more settings of an enabled profile (not shown), a menu selection (not shown), or any other suitable selection mechanism (not shown) may be employed. The PTT terminal 42 again Registers with the SIP/IP core 48 by sending a SIP Register request 64 to the SIP/IP core 48 containing a Contact header 65 with a feature-param of +poc.operating.mode="Manual". Next, the SIP registrar 46 in the SIP/IP core 48 performs another third party registration with the PTT server 44 when the PTT terminal 42 re-registers. The SIP registrar 46 in the SIP/IP core 48 sends a SIP Register request 66 to the PTT server 44 containing a Contact header 67 with a feature-param of +poc.operating.mode="Manual". The PTT server 44 switches the state 54 of the corresponding PTT terminal 42 in its state table 56 to Manual-Answer Mode 68. Then, the SIP registrar 46 in the SIP/IP core 48 responds to the SIP Register request 64 with a SIP 200 OK response 70 to the PTT terminal 42. Finally, the PTT server 44 responds to the SIP Register request 66 with a SIP 200 OK response 72 to the SIP registrar 46 in the SIP/IP core 48.

EXAMPLE 2

An example SIP Register request sent by the PTT terminal 42 to indicate Manual-Answer Mode is as follows:
REGISTER sip:example.com SIP/2.0
From: sip:POCuser@example.com;tag=asd98
To: sip:POCuser@example.com
Call-ID: hh89as0d-asd88jkk@host.example.com
CSeq: 9987 REGISTER
Max-Forwards: 70
Via: SIP/2.0/UDP POChost.example.com; branch=z9hG4bKnashds8
Contact: <sip:POCuser@host.example.com>;audio;+poc.operating.mode="Manual";mobility="mobile"; methods="INVITE,BYE,OPTIONS,ACK,CANCEL"
Content-Length: 0

Figure 4:
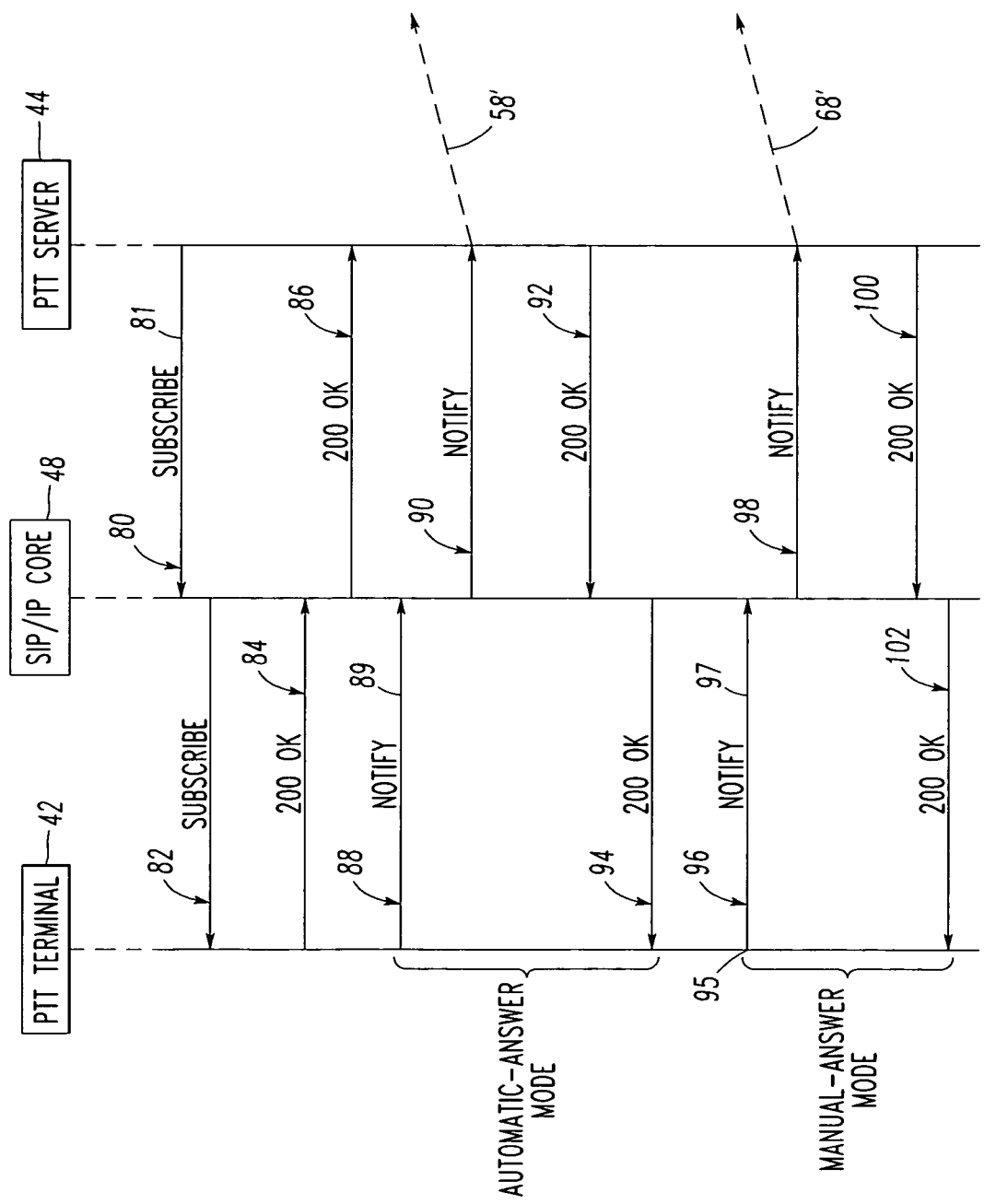
FIG. 4 is a message diagram in accordance with another embodiment of the invention.

Referring to FIG. 4, another message diagram shows message sequences for changing the operating mode of the PTT terminal 42 at the PTT server 44. SIP supports the ability of SIP devices, such as PTT server 44, to subscribe and be notified of events that occur in other SIP devices, such as PTT terminal 42, using a suitable subscription mechanism. This mechanism involves subscription using a SIP Subscribe method to a SIP Event package. An authorized subscription receives notifications about events related to the Event package using the SIP Notify method.

An Event Package is an application specific specification which defines a set of state information to be reported by a notifier to a subscriber.

An Event Template-Package is a special kind of event package which defines a set of states which may be applied to all possible event packages, including itself.

A Notification is the act of a notifier sending a Notify message to a subscriber to inform the subscriber of the state of a resource.

A Notifier is a user agent which generates Notify requests for the purpose of notifying subscribers of the state of a resource. Notifiers typically also accept Subscribe requests to create subscriptions.

A State Agent is a notifier which publishes state information on behalf of a resource; in order to do so, it may need to gather such state information from multiple sources. State Agents always have complete state information for the resource for which they are creating notifications.

A Subscriber is a user agent, which receives Notify requests from notifiers. These Notify requests contain information about the state of a resource in which the subscriber is interested. Subscribers typically also generate Subscribe requests and send them to notifiers to create subscriptions.

A Dialog is a peer-to-peer SIP relationship between two user agents that persists for some time. A Dialog is established by SIP messages, such as a 2xx response to an invite request.

A Subscription is a set of application states associated with a Dialog. This application state includes a pointer to the associated dialog, the event package name, and possibly an identification token. New Event packages can be defined for additional subscription state information. By definition, subscriptions exist in both a subscriber and a notifier.

The SIP Event Package may be advantageously employed for the PTT terminal operating mode. The SIP/IP PTT network server (e.g., PTT server 44) that controls the setup of PTT sessions subscribes to the corresponding SIP PTT terminal's operating (answer) mode Event package. The corresponding PTT terminal, such as 42, then, sends SIP Notify requests, such as 88 or 96, to the PTT server 44 whenever the operating (answer) mode changes at that PTT terminal.

Entities in the SIP/IP network can subscribe to resource or call state for various resources or calls in the network, and those entities (or entities acting on their behalf) can send notifications when those states change. A typical flow of messages might include: (1) a Subscribe from the Subscriber to the Notifier, in order to request a state subscription; (2) a 200 OK response from the Notifier to the Subscriber to acknowledge the subscription; (3) a Notify from the Notifier to the Subscriber to return current state information; (4) a 200 OK response from the Subscriber to the Notifier, in order to acknowledge the Notify; and (5) any further repetitions of messages (3) and (4) for further state information. Thus, Notify messages are sent to inform Subscriber(s) of changes in state to which the Subscriber has a subscription. Subscriptions are typically put in place using the SIP Subscribe method, although other suitable mechanisms may be employed.

As shown in FIG. 4, after the PTT terminal 42 has initially registered, the PTT server 44 Subscribes to the corresponding PTT terminal's operating (answer) mode XML Event package, which is defined for this application by sending a SIP Subscribe request 80 for the operating (answer) mode XML Event package 81 to the SIP/IP core 48. Next, the SIP/IP core 48 routes the SIP Subscribe 80, as shown at 82, to the PTT terminal 42. Then, the PTT terminal 42, which will perform the role of a Notifier, responds to the SIP Subscribe 80, as routed at 82, with a SIP 200 OK response 84 to the SIP/IP core 48. In turn, the SIP/IP core 48 routes the SIP 200 OK response 84, as shown at 86, to the PTT server 44.

For the Automatic-Answer Mode, the PTT terminal 42 notifies its current operating mode (e.g., Automatic-Answer Mode) by sending a SIP Notify 88 containing the Operating Mode=Auto 89 in the body of the Notify 88 to the SIP/IP core 48. Then, the SIP/IP core 48 routes the SIP Notify 88, as shown at 90, to the PTT server 44. In response, the PTT server 44 sets the state 54 (FIG. 3) of the corresponding PTT terminal 42 in its state table 56 (FIG. 3) to Automatic-Answer Mode 58'. Then, the PTT server 44 responds to the Notify 88, as routed at 90, with a SIP 200 OK response 92 to the SIP/IP core 48. Finally, the SIP/IP core 48 routes the SIP 200 OK response 92, as shown at 94, to the PTT terminal 42.

At 95, the user switches the PTT terminal 42 from Automatic-Answer Mode to Manual-Answer Mode. This triggers the PTT terminal 42 to notify its new operating mode (Manual-Answer Mode) by sending a SIP Notify 96 containing the Operating Mode=Manual 97 in the body of the Notify 96 to the SIP/IP core 48. The SIP/IP core 48 routes the SIP Notify 96, as shown at 98, to the PTT server 44. In response, the PTT server 44 switches the state 54 (FIG. 3) of the corresponding PTT terminal 42 in its state table 56 (FIG. 3) to Manual-Answer Mode 68'. Then, the PTT server 44 responds to the Notify 96, as routed at 98, with a SIP 200 OK response 100 to the SIP/IP core 48.

Finally, the SIP/IP core 48 routes the SIP 200 OK response 100, as shown at 102, to the PTT terminal 42.

Figure 5A:
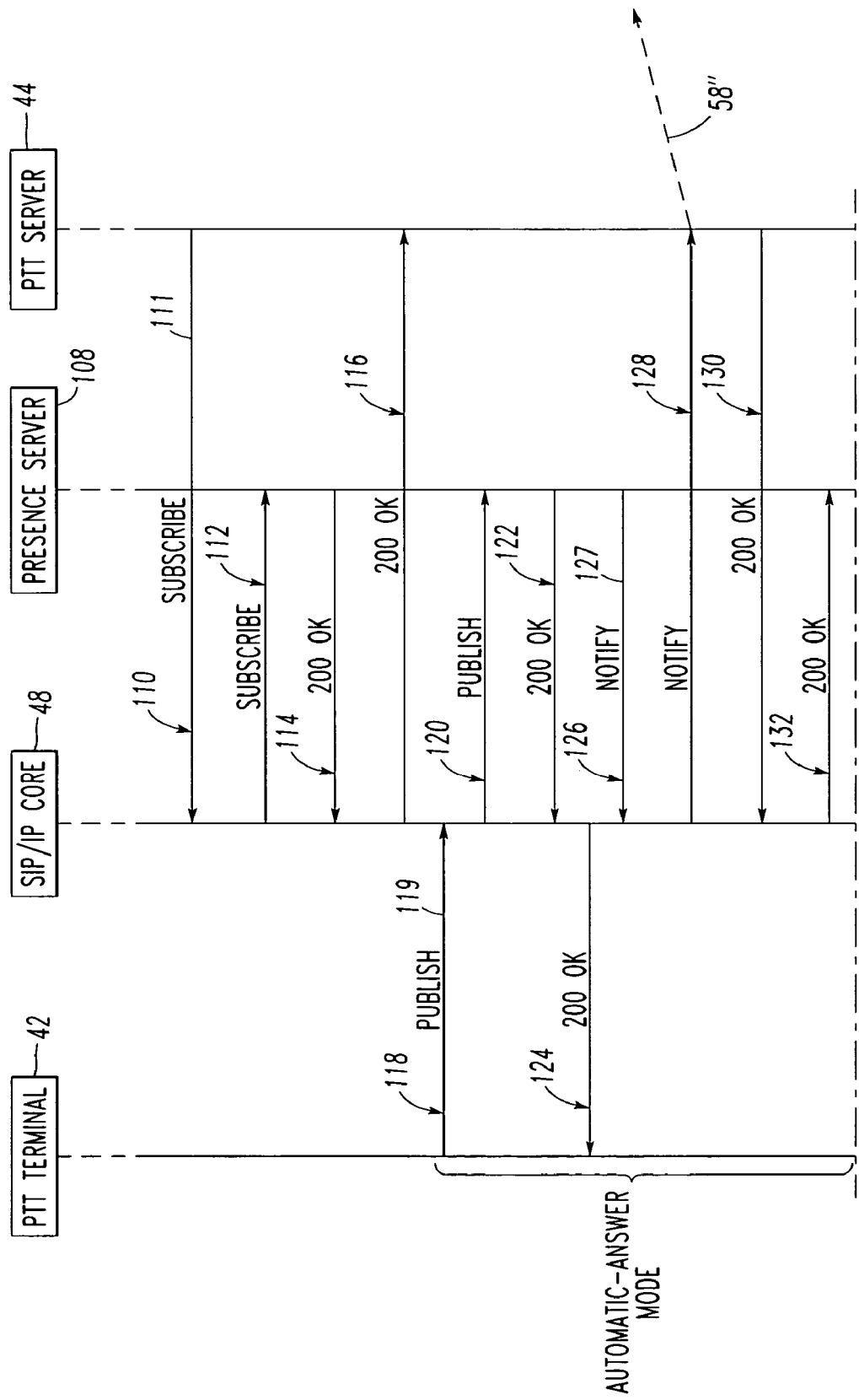
FIGS. 5A-5B form a message diagram in accordance with another embodiment of the invention.

Referring to FIG. 5A, another message diagram shows message sequences for changing the operating mode of the PTT terminal 42 at the PTT server 44. User presence represents the willingness and ability of a user to communicate with other users on the SIP/IP network. SIP supports presence functionality and the ability of PTT terminals, such as 42, to publish presence state information about themselves using a suitable SIP Publish method to a suitable Presence User Agent, such as presence server 108. The presence server 108 includes a set of contact addresses that represent the various mechanisms for contacting the user. Typically, the contact address listed for voice will be an address-of-record. The status of that contact may depend upon any number of factors, including, for example, the state of any registrations against that address-of-record. Registration state may be equated to user presence. In fact, this allows for the Presence server 108 to be separated from the SIP registrar 46 (FIG. 3), yet still use registration information to construct a presence document, which describes the presence of the presentity (e.g., a presence entity; a provider of presence information to a presence service) to which the SIP registrar 46 (FIG. 3) has subscribed. This is discussed in greater detail, below, in connection with FIG. 6 and Example 3.

When the presence server 108 receives a presence subscription for a particular user, the presence server 108 can generate a subscription to the SIP registrar 46 (FIG. 3) for the registration event package. As a result, the presence server 108 would learn about the registration state for that user, and it could use that information to generate presence documents. Alternatively, the SIP registrar 46 could Publish the Registration State to the presence server 108 using SIP Publish (e.g., as is discussed below in connection with FIGS. 5A-5B), or the presence server 108 could receive a third party registration from the SIP Registrar 46 when a new user registers (e.g., as is discussed below in connection with FIG. 6).

Figure 5B:
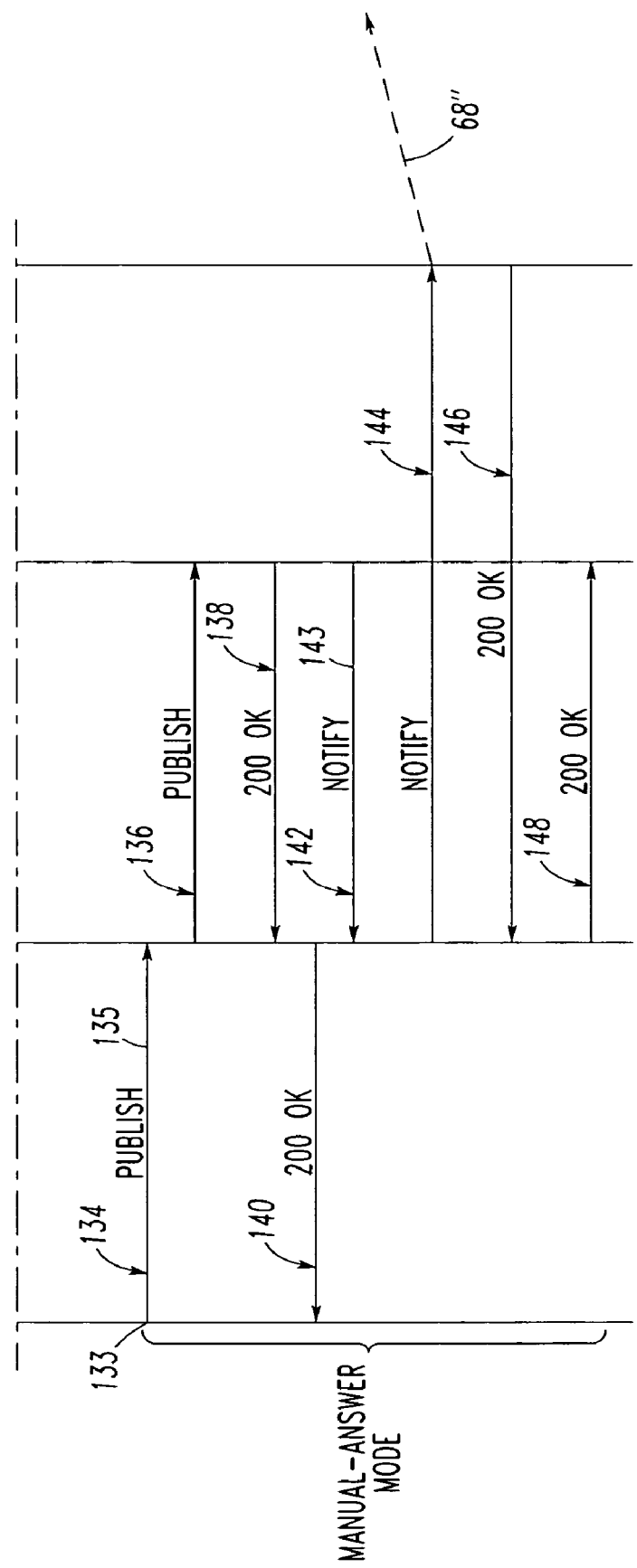

With reference to FIGS. 5A-5B, the PTT terminal 42 publishes its operating (answer) mode either as a separate presence tuple or as an attribute of another presence tuple transported using the SIP Publish method. The Publish method is routed either to: (1) a network based Presence server entity, such as presence server 108, which allows the SIP PTT network server 44 that controls the setup of PTT sessions to Subscribe to the corresponding SIP PTT terminal's Presence status for the operating (answer) mode, or (2) the SIP PTT network server 44, which implements the Presence User Agent functions. In the latter example, the Presence server 108 gets merged with the PTT server 44. Hence, the PTT server 44 implements the Presence server 108 functionality with message exchanges being employed between the combined entities.

After the PTT terminal 42 has initially registered with the SIP registrar 46 (FIG. 3), the PTT server 44 Subscribes to the corresponding PTT terminal's Presence state by sending a SIP Subscribe request 110 for the Presence Event package for the PTT user via the SIP/IP core 48. If the PTT server 44 is only interested in the Operating Mode state, then the body of the Subscribe 110 may contain filters 111 indicating that only changes to the Operating Mode state should be notified.

In turn, the SIP/IP core 48 routes the SIP Subscribe 110, as shown at 112, to the Presence server 108. Then, the Presence server 108 responds to the Subscribe 110, as routed at 112, with a SIP 200 OK response 114 via the SIP/IP core 48. Next, the SIP/IP core 48 routes the SIP 200 OK response 114, as shown at 116, to the PTT server 44.

In the Automatic-Answer Mode, the PTT terminal 42 notifies its current operating mode (e.g., Automatic-Answer Mode) and, optionally, an additional presence state by sending a SIP Publish 118 containing the Operating Mode=Auto 119 in the body of the Publish 118 to the SIP/IP core 48. Then, the SIP/IP core 48 routes the SIP Publish 118, as shown at 120, to the Presence server 108. Next, the Presence server 108 responds to the Publish 118, as routed at 120, with a SIP 200 OK response 122 to the SIP/IP core 48. In turn, the SIP/IP core 48 routes the SIP 200 OK response 122, as shown at 124, to the PTT terminal 42.

Next, the Presence server 108 notifies the corresponding PTT terminal's operating (answer) mode by sending a SIP Notify 126 containing the Presence Information including the Operating Mode=Auto 127 in the body of the Notify 126 to the SIP/IP core 48. Then, the SIP/IP core 48 routes the SIP Notify 126, as shown at 128, to the PTT server 44. In turn, the PTT server 44 sets the state 54 (FIG. 3) of the corresponding PTT terminal 42 in its state table 56 (FIG. 3) to Automatic-Answer Mode 58". Next, the PTT server 44 responds to the Notify 126, as routed at 128, with a SIP 200 OK response 130 to the SIP/IP core 48. Finally, the SIP/IP core 48 routes the SIP 200 OK response 130, as shown at 132, to the Presence server 108.

Also referring to FIG. 5B, at 133, the user switches the PTT terminal 42 from Automatic-Answer Mode to Manual-Answer Mode. This triggers the PTT terminal 42 to notify its current operating (answer) mode and, optionally, an additional presence state by sending a SIP Publish 134 containing the Operating Mode=Manual 135 in the body of the Publish 134 to the SIP/IP core 48. In turn, the SIP/IP core 48 routes the SIP Publish 134, as shown at 136, to the Presence server 108. Then, the Presence server 108 responds to the Publish 134, as routed at 136, with a SIP 200 OK response 138 to the SIP/IP core 48. Next, the SIP/IP core 48 routes the SIP 200 OK response 138, as shown at 140, to the PTT terminal 42.

In turn, the Presence server 108 notifies the corresponding PTT terminal's new operating (answer) mode by sending a SIP Notify 142 containing the Presence Information including the Operating Mode=Manual 143 in the body of the Notify 142 to the SIP/IP core 48. Then, the SIP/IP core 48 routes the SIP Notify 142, as shown at 144, to the PTT server 44. Next, the PTT server 44 switches the state 54 (FIG. 3) of the corresponding PTT terminal 42 in its state table 56 (FIG. 3) to Manual-Answer Mode 68". Then, the PTT server 44 responds to the Notify 142, as routed at 144, with a SIP 200 OK response 146 to the SIP/IP core 48. Finally, the SIP/IP core 48 routes the SIP 200 OK response 146, as shown at 148, to the Presence server 108.

Referring to FIG. 6, as an alternative to the SIP registrar 46 in the SIP/IP core 48 of FIG. 3 sending the SIP Register requests 52 or 66 to the PTT server 44, the SIP registrar 46 may Publish to the Presence server 108 the PTT terminal SIP registration and have the PTT server 44 subscribe to the Presence server 108, in order to discover the SIP registration and have the Presence server 108 deliver the operating answer mode that was Published by the SIP registrar 46. Although the following disclosure is with respect to the Automatic-Answer Mode, it will be appreciated that a suitable corresponding indication mechanism may be employed for the Manual-Answer Mode or the Always-Automatic-Answer Mode.

Before the PTT terminal 42 registers with the SIP registrar 46, the PTT server 44 Subscribes to the corresponding PTT terminal's Presence state by sending a SIP Subscribe request 210 to subscribe to the Presence Events of that PTT terminal via the SIP/IP core 48. If the PTT server 44 is only interested in the Operating Mode state, then the body of the Subscribe 210 may contain filters 211 indicating that only changes to the Operating Mode state should be notified. In turn, the SIP/IP core 48 routes the SIP Subscribe 210, as shown at 212, to the Presence server 108. Then, the Presence server 108 responds to the Subscribe 210, as routed at 212, with a SIP 200 OK response 214 via the SIP/IP core 48. Next, the SIP/IP core 48 routes the SIP 200 OK response 214, as shown at 216, to the PTT server 44.

Next, the Presence server 108 notifies that the PTT terminal 42 is currently not registered by sending a SIP Notify 226 containing the Presence Information including the State Unregistered 227 in the body of the Notify 226 to the SIP/IP core 48. Then, the SIP/IP core 48 routes the SIP Notify 226, as shown at 228, to the PTT server 44. In response, the PTT server 44 sets the state 54 (FIG. 3) of the corresponding PTT terminal 42 in its state table 56 (FIG. 3) to Not Registered 217. Next, the PTT server 44 responds to the Notify 226, as routed at 228, with a SIP 200 OK response 230 to the SIP/IP core 48. Finally, the SIP/IP core 48 routes the SIP 200 OK response 230, as shown at 232, to the Presence server 108.

Then, after the PTT terminal 42 is powered, it Registers with the SIP/IP core 48 in Automatic-Answer Mode by sending the SIP Register request 250 to the SIP/IP core 48 containing the Contact header 251 with a feature-param of +poc.operating.mode="Auto". The SIP registrar 46 in the SIP/IP core 48 is configured to perform third party registrations with the Presence server 108 when the PTT terminal 42 registers. Then, the SIP registrar 46 in the SIP/IP core 48 sends a SIP Register request 252 to the Presence server 108 containing a Contact header 253 with a feature-param of +poc.operating.mode="Auto". In response, the Presence server 108 sets the state 254 of the PTT terminal 42 in the Presence Document (PD) 256 to Registered and Automatic-Answer Mode. Then, the SIP registrar 46 in the SIP/IP core 48 responds to the SIP Register request 250 with a SIP 200 OK response 260 to the PTT terminal 42. Next, the Presence server 108 responds to the SIP Register request 252 with a SIP 200 OK response 262 to the SIP registrar 46 in the SIP/IP core 48.

The Presence server 108 also notifies the corresponding PTT terminal's operating (answer) mode by sending a SIP Notify 266 containing the Presence Information including the Registration State=Registered and Operating Mode 267 in the body of the Notify 266 to the SIP/IP core 48. Then, the SIP/IP core 48 routes the SIP Notify 266, as shown at 268, to the PTT server 44. In turn, the PTT server 44 sets the state 54 (FIG. 3) of the corresponding PTT terminal 42 in its state table 56 (FIG. 3) to Registered and Automatic-Answer Mode 58'''. Next, the PTT server 44 responds to the Notify 266, as routed at 268, with a SIP 200 OK response 270 to the SIP/IP core 48. Finally, the SIP/IP core 48 routes the SIP 200 OK response 270, as shown at 272, to the Presence server 108.

It will be appreciated that if the PTT terminal 42 changes from the Automatic-Answer Mode to one of the Manual-Answer Mode or the Always-Automatic-Answer Mode, that the PTT terminal 42 would Register with the SIP/IP core 48 in the appropriate mode by employing the SIP Register request 250 containing the Contact header 251 with the appropriate feature-param (e.g., +poc.operating.mode="Manual" or "Always-Auto," respectively), and that the SIP Register request 252 containing the Contact header 253 would also have the appropriate feature-param. Otherwise, the messages 250,252,260,262,266,268, 270,272 are employed in a similar manner.

Figure 7:
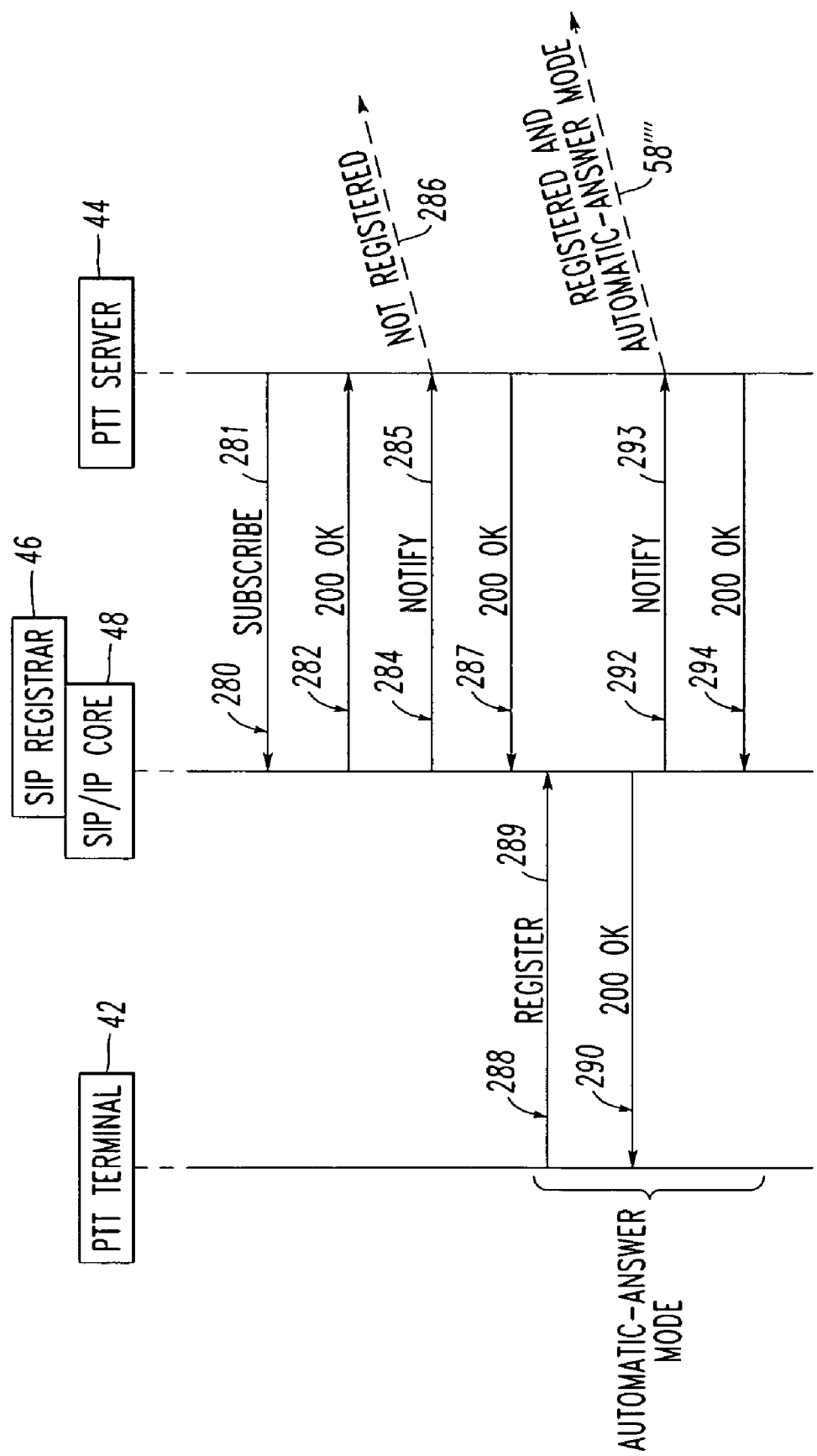

FIG. 7 shows another alternative to the SIP registrar 46 in the SIP/IP core 48 of FIG. 3 sending the SIP Register requests 52 or 66 to the PTT server 44. Although the following disclosure is with respect to the Automatic-Answer Mode, it will be appreciated that a suitable corresponding indication mechanism may be employed for the Manual-Answer Mode or the Always-Automatic-Answer Mode. For example, if the user switches the PTT terminal 42 to Manual-Answer Mode, then this triggers a refresh Registration by that PTT terminal. The PTT terminal 42 again Registers with the SIP/IP core 48 by sending another SIP Register request (not shown) to the SIP/IP core 48 containing a Contact header (not shown) with a feature-param of +poc.operating.mode="Manual".

Initially, in FIG. 7, the PTT server 44 sends a SIP Subscribe request 280 to the SIP Registrar 46 in the SIP/IP core 48 to subscribe to the Registration Events 281 of the PTT terminal 42. Then, the SIP Registrar 46 responds to the Subscribe 280 with a SIP 200 OK response 282 to the PTT server 44. Next, the SIP Registrar 46 notifies that the PTT terminal 42 is currently not registered by sending a SIP Notify 284 containing the state Unregistered 285 in the body of the Notify 284 to the PTT server 44. In response, the PTT server 44 sets the state 54 (FIG. 3) of the corresponding PTT terminal 42 in its state table 56 (FIG. 3) to the state Not Registered 286. Then, the PTT server 44 responds to the Notify 284 with a SIP 200 OK response 287 to the SIP Registrar 46.

After the PTT terminal 42 is powered, it Registers with the SIP/IP core 48 in Automatic-Answer Mode by sending a SIP Register request 288 to the SIP/IP core 48 containing a Contact header 289 with a feature-param of +poc.operating.mode="Auto". Next, the SIP Registrar 46 in the SIP/IP core 48 responds to the Register 288 with a SIP 200 OK response 290 to the PTT terminal 42. Then, the SIP Registrar 46 in the SIP/IP core 48 notifies the corresponding PTT terminal's Registration and Operating mode by sending a SIP Notify 292 containing the Registration State=Registered and Operating Mode=Auto 293 in the body of the Notify 292 to the PTT server 44. In response, the PTT server 44 sets the state 54 (FIG. 3) of the corresponding PTT terminal 42 in its state table 56 (FIG. 3) to the Registered and Automatic-Answer Mode 58'''. Finally, the PTT server 44 responds to the Notify 292 with a SIP 200 OK response 294 to the SIP registrar 46.

It will be appreciated that if the PTT terminal 42 changes from the Automatic-Answer Mode to one of the Manual-Answer Mode or the Always-Automatic-Answer Mode, that the PTT terminal 42 would Register with the SIP/IP core 48 in the appropriate mode by employing the SIP Register request 288 containing the Contact header 289 with the appropriate feature-param (e.g., +poc.operating.mode="Manual" or "Always-Auto," respectively), and that the SIP Notify 292 containing the Registration State=Registered and Operating Mode 293 would include the appropriate registered operating mode. Otherwise, the messages 288,290,292,294 are employed in a similar manner.

Figure 8:
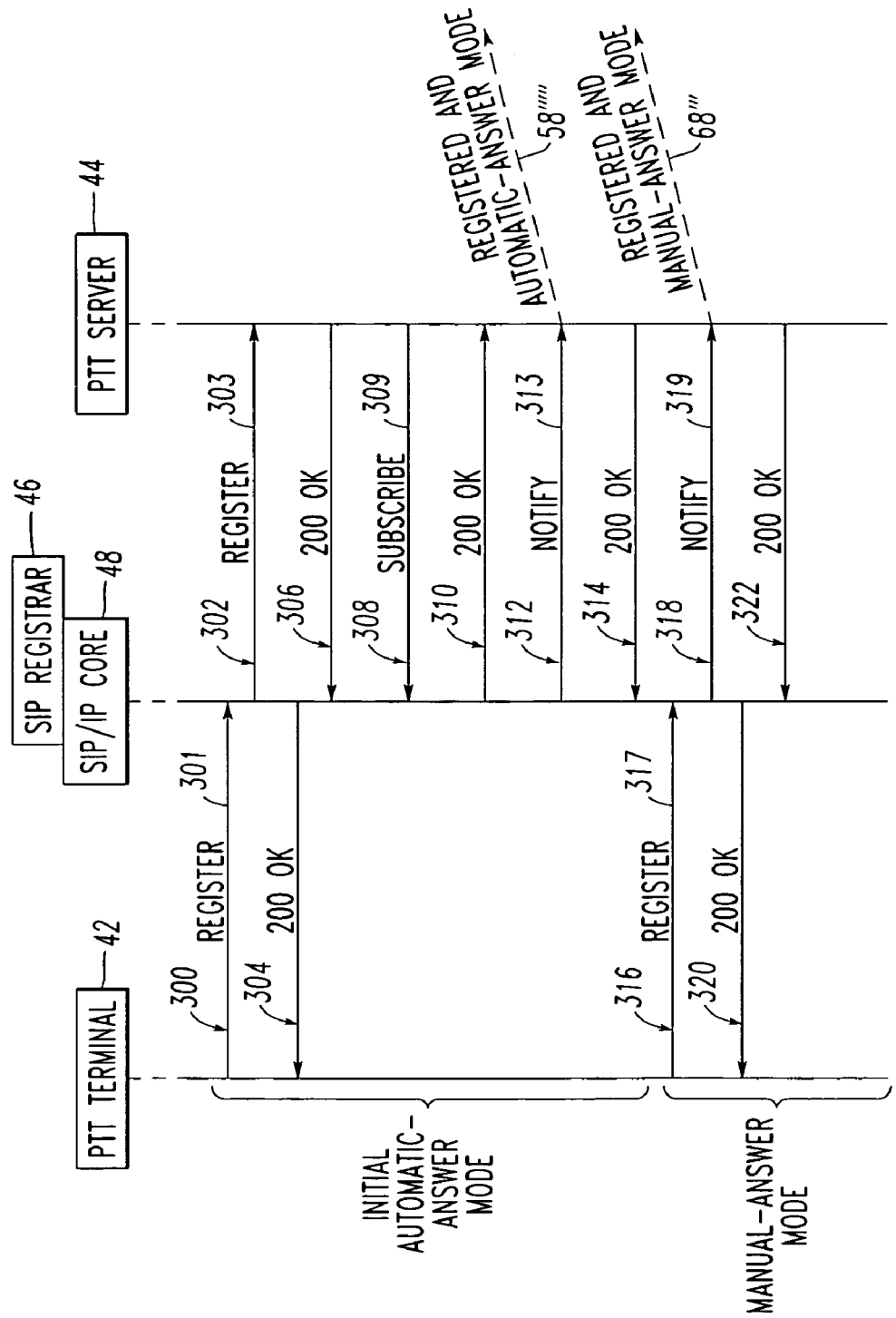

FIG. 8 shows another alternative to the SIP registrar 46 in the SIP/IP core 48 of FIG. 3 sending the SIP Register requests 52 or 66 to the PTT server 44. Although the following disclosure is with respect to an initial mode (e.g., the Automatic-Answer Mode) and a subsequent mode (e.g., the Manual-Answer Mode), it will be appreciated that a suitable corresponding indication mechanism may be employed for subsequent mode changes (e.g., to the Always-Automatic-Answer Mode). For example, if the user switches the PTT terminal 42 to the Always-Automatic-Answer Mode, then this triggers a refresh Registration by that PTT terminal. The PTT terminal 42 again Registers with the SIP/IP core 48 by sending another SIP Register request (not shown) to the SIP/IP core 48 containing a Contact header (not shown) with a feature-param of +poc.operating.mode="Always-Auto".

In FIG. 8, the SIP registrar 46 only performs a third party registration on an initial registration (e.g., after the PTT terminal 42 powers on). The PTT server 44, in response to the initial third party registration, subscribes to the PTT terminal's Registration Event package, in order to obtain the operating mode of that PTT terminal and other changes to the registration state.

First, the PTT terminal 42 is powered on and Registers with the SIP/IP core 48 by sending a SIP Register request 300 to the SIP/IP core 48 containing a Contact header 301 with a feature-param of +poc.operating.mode="Auto". The SIP Registrar 46 in the SIP/IP core 48 has been configured to perform third party registrations with the PTT server 44 when the PTT terminal 42 initially registers. Next, the SIP Registrar 46 in the SIP/IP core 48 sends a SIP Register request 302 to the PTT server 44. This SIP Register request 302 does not contain an operating mode parameter in the contact header 303. Then, the SIP Registrar 46 in the SIP/IP core 48 responds to the Register 300 with a SIP 200 OK response 304 to the PTT terminal 42. The PTT server 44 responds to the Register 302 with a SIP 200 OK response 306 to the SIP Registrar 46 in the SIP/IP core 48. Next, the PTT server 44 sends a SIP Subscribe request 308 to SIP Registrar 46 in the SIP/IP core 48, in order to subscribe to the Registration Events 309 of the PTT terminal 42. Then, the SIP Registrar 46 responds to the Subscribe 308 with a SIP 200 OK response 310 to the PTT server 44.

The SIP Registrar 46 in the SIP/IP core 48 also notifies the PTT terminal's Registration and Operating mode by sending a SIP Notify 312 containing the Registration State=Registered and Operating Mode=Auto 313 in the body of the Notify 312 to the PTT server 44. In response, the PTT server 44 sets the state 54 (FIG. 3) of the corresponding PTT terminal 42 in its state table 56 (FIG. 3) to Registered and Automatic-Answer Mode 58''''. Finally, for this initial mode, the PTT server 44 responds to the Notify 312 with a SIP 200 OK response 314 to the SIP Registrar 46.

If the user switches the PTT terminal 42 to, for example, the Manual-Answer Mode, then this triggers a refresh Registration by the PTT terminal 42. The PTT terminal 42 again Registers with the SIP/IP core 48 by sending a SIP Register request 316 to the SIP/IP core 48 containing a Contact header 317 with a feature-param of +poc.operating.mode="Manual". The SIP Registrar 46 in the SIP/IP core 48 responds to the Register 316 with a SIP 200 OK response 320 to the PTT terminal 42. The SIP Registrar 46 in the SIP/IP core 48 also notifies the PTT terminal's new Operating mode by sending a SIP Notify 318 containing the Presence Information including the Operating Mode=Manual 319 in the body of the Notify 318 to the PTT server 44. In response, the PTT server 44 switches the state 54 (FIG. 3) of the corresponding PTT terminal 42 in its state table 56 (FIG. 3) to Manual-Answer Mode 68'''. Finally, the PTT server 44 responds to the Notify 318 with a SIP 200 OK response 322 to the SIP Registrar 46.

With reference to FIG. 9A, the PTT terminal 42 communicates its operating (answer) mode using the SIP Publish method and an event package containing elements for the current value of its operating (answer) mode. The Publish method is routed to the SIP PTT network server 44.

The PTT terminal 42 has initially registered with the SIP registrar 46 (FIG. 3). In the Automatic-Answer Mode, the PTT terminal 42 notifies its current operating mode (e.g., Automatic-Answer Mode) by sending a SIP Publish 338 containing the Operating Mode=Auto 339 in the body of the Publish 338 to the SIP/IP core 48. Then, the SIP/IP core 48 routes the SIP Publish 338, as shown at 340, to the SIP PTT network server 44. In response, the PTT server 44 sets the state 54 (FIG. 3) of the corresponding PTT terminal 42 in its state table 56 (FIG. 3) to Automatic-Answer Mode 58''''. Next, the SIP PTT network server 44 responds to the Publish 338, as routed at 340, with a SIP 200 OK response 342 to the SIP/IP core 48. In turn, the SIP/IP core 48 routes the SIP 200 OK response 342, as shown at 344, to the PTT terminal 42.

Referring to FIG. 9B, at 353, the user switches the PTT terminal 42 from Automatic-Answer Mode to Manual-Answer Mode. This triggers the PTT terminal 42 to notify its current operating (answer) mode by sending a SIP Publish 354 containing the Operating Mode=Manual 355 in the body of the Publish 354 to the SIP/IP core 48. In turn, the SIP/IP core 48 routes the SIP Publish 354, as shown at 356, to the SIP PTT network server 44. In response, the PTT server 44 switches the state 54 (FIG. 3) of the corresponding PTT terminal 42 in its state table 56 (FIG. 3) to Manual-Answer Mode 68''''. Then, the SIP PTT network server 44 responds to the Publish 354, as routed at 356, with a SIP 200 OK response 358 to the SIP/IP core 48. Next, the SIP/IP core 48 routes the SIP 200 OK response 358, as shown at 360, to the PTT terminal 42.

EXAMPLE 3

As alternatives to the message diagrams of FIGS. 6 and 7, a wide range of variations and/or combinations of those message flows is possible. For example, the Presence server 108 of FIG. 6 may employ messages 280,282,284,287,292, 294 from FIG. 7, with the Presence server 108, instead of the PTT server 44, performing the Subscribing to the Registration Events 281 of the PTT terminal 42 in place of messages 252,262 of FIG. 6.

Although one Automatic-Answer Mode, one Always-Automatic-Answer Mode and one Manual-Answer Mode are disclosed in connection with FIG. 2, any one, two or all three of such modes may be employed.

Although the Automatic-Answer Mode and Manual-Answer Mode are disclosed in connection with FIGS. 3-5, 8 and 9A-9B, the Always-Automatic-Answer Mode or any one, two or all three of such modes may be employed.

Although the Automatic-Answer Mode is disclosed in connection with FIGS. 6 and 7, the Manual-Answer Mode, the Always-Automatic-Answer Mode or any one, two or all three of such modes may be employed.

As employed herein, the term "Automatic-Answer Mode" means the same as "Auto-Answer Mode".

As employed herein, the term "Auto-Answer Mode" means the same as "Automatic-Answer Mode".

As employed herein, the term "Always-Automatic-Answer Mode" means the same as "Always-Auto-Answer Mode".

As employed herein, the term "Always-Auto-Answer Mode" means the same as "Always-Automatic-Answer Mode".

The Group Management Server (GLMS) as referenced herein may be a Group List Management Server (not shown) or an XML Document Management Server (XDMS) (not shown). A document management server and/or database (not shown), which includes an XDMS or GLMS or Group List Management Server, stores group identities, contact lists, and/or authorization policies. Also, there may be one or more XDMSs that operate at the same time.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for a push-to-talk communication device including an operating mode to indicate said operating mode to a push-to-talk network server, said method comprising:
   employing as the operating mode of said push-to-talk communication device one of a first answer mode and a second answer mode;
   employing a communication network including a push-to-talk network server;
   indicating said operating mode in a Session Initiation Protocol message from said push-to-talk communication device to said push-to-talk network server over said communication network;
   employing as said first answer mode an automatic-answer mode;
   employing as said second answer mode a manual-answer mode;
   employing as said communication network an Internet Protocol core network;
   employing as said push-to-talk network server an Internet Protocol push-to-talk network server;
   registering the operating mode of said push-to-talk communication device with said Internet Protocol push-to-talk network server;
   employing a Session Initiation Protocol registrar on said Internet Protocol core network;
   sending a first Session Initiation Protocol Register message from said push-to-talk communication device to said Session Initiation Protocol registrar;
   employing as the operating mode of said push-to-talk communication device said automatic-answer mode; and
   including in said first Session Initiation Protocol Register message a header having a parameter representing said automatic-answer mode.

2. The method of claim 1 further comprising:
   sending a second Session Initiation Protocol Register message from said Session Initiation Protocol registrar to said Internet Protocol push-to-talk network server;
   including in said second Session Initiation Protocol Register message a header having a parameter representing said automatic-answer mode; and
   setting a state of said push-to-talk communication device to said automatic-answer mode at said Internet Protocol push-to-talk network server.

3. A method for a push-to-talk communication device including an operating mode to indicate said operating mode to a push-to-talk network server, said method comprising:
   employing as the operating mode of said push-to-talk communication device one of a first answer mode and a second answer mode;
   employing a communication network including a push-to-talk network server;
   indicating said operating mode in a Session Initiation Protocol message from said push-to-talk communication device to said push-to-talk network server over said communication network;
   employing as said first answer mode an automatic-answer mode;
   employing as said second answer mode a manual-answer mode;
   employing as said communication network an Internet Protocol core network;
   employing as said push-to-talk network server an Internet Protocol push-to-talk network server;
   registering the operating mode of said push-to-talk communication device with said Internet Protocol push-to-talk network server;
   employing a Session Initiation Protocol registrar on said Internet Protocol core network;
   sending a first Session Initiation Protocol Register message from said push-to-talk communication device to said Session Initiation Protocol registrar;
   employing as the operating mode of said push-to-talk communication device an always-automatic-answer mode; and including in said first Session Initiation Protocol Register message a header having a parameter representing said always-automatic-answer mode.

4. The method of claim 3 further comprising:
sending a second Session Initiation Protocol Register message from said Session Initiation Protocol registrar to said Internet Protocol push-to-talk network server;
including in said second Session Initiation Protocol Register message a header having a parameter representing said always-automatic-answer mode; and
setting a state of said push-to-talk communication device to said always-automatic-answer mode at said Internet Protocol push-to-talk network server.

5. A method for a push-to-talk communication device including an operating mode to indicate said operating mode to a push-to-talk network server, said method comprising:
employing as the operating mode of said push-to-talk communication device one of a first answer mode and a second answer mode;
employing a communication network including a push-to-talk network server;
indicating said operating mode in a Session Initiation Protocol message from said push-to-talk communication device to said push-to-talk network server over said communication network;
employing as said first answer mode an automatic-answer mode;
employing as said second answer mode a manual-answer mode;
employing as said communication network an Internet Protocol core network;
employing as said push-to-talk network server an Internet Protocol push-to-talk network server;
registering the operating mode of said push-to-talk communication device with said Internet Protocol push-to-talk network server;
employing a Session Initiation Protocol registrar on said Internet Protocol core network;
sending a first Session Initiation Protocol Register message from said push-to-talk communication device to said Session Initiation Protocol registrar;
employing as the operating mode of said push-to-talk communication device said manual-answer mode; and
including in said first Session Initiation Protocol Register message a header having a parameter representing said manual-answer mode.

6. The method of claim 5 further comprising:
sending a second Session Initiation Protocol Register message from said Session Initiation Protocol registrar to said Internet Protocol push-to-talk network server;
including in said second Session Initiation Protocol Register message a header having a parameter representing said manual-answer mode; and
setting a state of said push-to-talk communication device to said manual-answer mode at said Internet Protocol push-to-talk network server.

7. A method for a push-to-talk communication device including an operating mode to indicate said operating mode to a push-to-talk network server, said method comprising:
employing as the operating mode of said push-to-talk communication device one of a first answer mode and a second answer mode;
employing a communication network including a push-to-talk network server;
indicating said operating mode in a Session Initiation Protocol message from said push-to-talk communication device to said push-to-talk network server over said communication network;
employing as said first answer mode an automatic-answer mode;
employing as said second answer mode a manual-answer mode;
employing as said communication network an Internet Protocol core network;
employing as said push-to-talk network server an Internet Protocol push-to-talk network server;
notifying said Internet Protocol push-to-talk network server of the operating mode of said push-to-talk communication device;
sending a Session Initiation Protocol Subscribe message associated with said operating mode of said push-to-talk communication device from said Internet Protocol push-to-talk network server to said Internet Protocol core network;
routing said Session Initiation Protocol Subscribe message by said Internet Protocol core network to said push-to-talk communication device;
defining and employing an event package, including said automatic-answer mode, which is owned by said push-to-talk communication device;
subscribing using said Session Initiation Protocol Subscribe message to said event package on said push-to-talk communication device;
sending a Session Initiation Protocol Notify message for said automatic-answer mode from said push-to-talk communication device to said Internet Protocol core network;
routing said Session Initiation Protocol Notify message by said Internet Protocol core network to said Internet Protocol push-to-talk network server; and
setting a state of said push-to-talk communication device to said automatic-answer mode at said Internet Protocol push-to-talk network server.

8. A method for a push-to-talk communication device including an operating mode to indicate said operating mode to a push-to-talk network server, said method comprising:
employing as the operating mode of said push-to-talk communication device one of a first answer mode and a second answer mode;
employing a communication network including a push-to-talk network server;
indicating said operating mode in a Session Initiation Protocol message from said push-to-talk communication device to said push-to-talk network server over said communication network;
employing as said first answer mode an automatic-answer mode;
employing as said second answer mode a manual-answer mode;
employing as said communication network an Internet Protocol core network;
employing as said push-to-talk network server an Internet Protocol push-to-talk network server;
notifying said Internet Protocol push-to-talk network server of the operating mode of said push-to-talk communication device;
sending a Session Initiation Protocol Subscribe message associated with said operating mode of said push-to-talk communication device from said Internet Protocol push-to-talk network server to said Internet Protocol core network;

routing said Session Initiation Protocol Subscribe message by said Internet Protocol core network to said push-to-talk communication device;
defining and employing an event package, including an always-automatic-answer mode, which is owned by said push-to-talk communication device;
subscribing using said Session Initiation Protocol Subscribe message to said event package on said push-to-talk communication device;
sending a Session Initiation Protocol Notify message for said always-automatic-answer mode from said push-to-talk communication device to said Internet Protocol core network;
routing said Session Initiation Protocol Notify message by said Internet Protocol core network to said Internet Protocol push-to-talk network server; and
setting a state of said push-to-talk communication device to said always-automatic-answer mode at said Internet Protocol push-to-talk network server.

9. A method for a push-to-talk communication device including an operating mode to indicate said operating mode to a push-to-talk network server, said method comprising:
employing as the operating mode of said push-to-talk communication device one of a first answer mode and a second answer mode;
employing a communication network including a push-to-talk network server;
indicating said operating mode in a Session Initiation Protocol message from said push-to-talk communication device to said push-to-talk network server over said communication network;
employing as said first answer mode an automatic-answer mode;
employing as said second answer mode a manual-answer mode;
employing as said communication network an Internet Protocol core network;
employing as said push-to-talk network server an Internet Protocol push-to-talk network server;
notifying said Internet Protocol push-to-talk network server of the operating mode of said push-to-talk communication device;
sending a Session Initiation Protocol Subscribe message associated with said operating mode of said push-to-talk communication device from said Internet Protocol push-to-talk network server to said Internet Protocol core network;
routing said Session Initiation Protocol Subscribe message by said Internet Protocol core network to said push-to-talk communication device;
defining and employing an event package, including said manual-answer mode, which is owned by said push-to-talk communication device;
subscribing using said Session Initiation Protocol Subscribe message to said event package on said push-to-talk communication device;
sending a Session Initiation Protocol Notify message for said manual-answer mode from said push-to-talk communication device to said Internet Protocol core network;
routing said Session Initiation Protocol Notify message by said Internet Protocol core network to said Internet Protocol push-to-talk network server; and
setting a state of said push-to-talk communication device to said manual-answer mode at said Internet Protocol push-to-talk network server.

10. A method for a push-to-talk communication device including an operating mode to indicate said operating mode to a push-to-talk network server, said method comprising:
employing as the operating mode of said push-to-talk communication device one of a first answer mode and a second answer mode;
employing a communication network including a push-to-talk network server;
indicating said operating mode in a Session Initiation Protocol message from said push-to-talk communication device to said push-to-talk network server over said communication network;
employing as said first answer mode an automatic-answer mode;
employing as said second answer mode a manual-answer mode;
employing as said communication network an Internet Protocol core network;
employing as said push-to-talk network server an Internet Protocol push-to-talk network server;
publishing the operating mode of said push-to-talk communication device to a Presence server of said Internet Protocol core network;
defining and employing an event package, for said push-to-talk communication device, including said operating mode;
sending a Session Initiation Protocol Publish message containing a representation of said automatic-answer mode from said push-to-talk communication device to said Internet Protocol core network;
routing said Session Initiation Protocol Publish message by said Internet Protocol core network to said Presence server;
sending a Session Initiation Protocol Notify message containing a representation of said automatic-answer mode from said Presence server to said Internet Protocol core network;
routing said Session Initiation Protocol Notify message by said Internet Protocol core network to said Internet Protocol push-to-talk network server; and
setting a state of said push-to-talk communication device to said automatic-answer mode at said Internet Protocol push-to-talk network server.

11. A method for a push-to-talk communication device including an operating mode to indicate said operating mode to a push-to-talk network server, said method comprising:
employing as the operating mode of said push-to-talk communication device one of a first answer mode and a second answer mode;
employing a communication network including a push-to-talk network server;
indicating said operating mode in a Session Initiation Protocol message from said push-to-talk communication device to said push-to-talk network server over said communication network;
employing as said first answer mode an automatic-answer mode;
employing as said second answer mode a manual-answer mode;
employing as said communication network an Internet Protocol core network;
employing as said push-to-talk network server an Internet Protocol push-to-talk network server;
publishing the operating mode of said push-to-talk communication device to a Presence server of said Internet Protocol core network;

defining and employing an event package, for said push-to-talk communication device, including said operating mode;

sending a Session Initiation Protocol Publish message containing a representation of said automatic-answer mode from said push-to-talk communication device to said Internet Protocol core network;

routing said Session Initiation Protocol Publish message by said Internet Protocol core network to said Internet Protocol push-to-talk network server; and setting a state of said push-to-talk communication device to said automatic-answer mode at said Internet Protocol push-to-talk network server.

12. A method for a push-to-talk communication device including an operating mode to indicate said operating mode to a push-to-talk network server, said method comprising:

employing as the operating mode of said push-to-talk communication device one of a first answer mode and a second answer mode;

employing a communication network including a push-to-talk network server;

indicating said operating mode in a Session Initiation Protocol message from said push-to-talk communication device to said push-to-talk network server over said communication network;

employing as said first answer mode an automatic-answer mode;

employing as said second answer mode a manual-answer mode;

employing as said communication network an Internet Protocol core network;

employing as said push-to-talk network server an Internet Protocol push-to-talk network server;

publishing the operating mode of said push-to-talk communication device to a Presence server of said Internet Protocol core network;

defining and employing an event package, for said push-to-talk communication device, including said operating mode; and sending a Session Initiation Protocol Publish message containing a representation of an always-automatic-answer mode from said push-to-talk communication device to said Internet Protocol core network.

13. The method of claim 12 further comprising:

routing said Session Initiation Protocol Publish message by said Internet Protocol core network to said Presence server;

sending a Session Initiation Protocol Notify message containing a representation of said always-automatic-answer mode from said Presence server to said Internet Protocol core network;

routing said Session Initiation Protocol Notify message by said Internet Protocol core network to said Internet Protocol push-to-talk network server; and setting a state of said push-to-talk communication device to said always-automatic-answer mode at said Internet Protocol push-to-talk network server.

14. The method of claim 12 further comprising:

routing said Session Initiation Protocol Publish message by said Internet Protocol core network to said Internet Protocol push-to-talk network server; and setting a state of said push-to-talk communication device to said always-automatic-answer mode at said Internet Protocol push-to-talk network server.

15. A method for a push-to-talk communication device including an operating mode to indicate said operating mode to a push-to-talk network server, said method comprising:

employing as the operating mode of said push-to-talk communication device one of a first answer mode and a second answer mode;

employing a communication network including a push-to-talk network server;

indicating said operating mode in a Session Initiation Protocol message from said push-to-talk communication device to said push-to-talk network server over said communication network;

employing as said first answer mode an automatic-answer mode;

employing as said second answer mode a manual-answer mode;

employing as said communication network an Internet Protocol core network;

employing as said push-to-talk network server an Internet Protocol push-to-talk network server;

publishing the operating mode of said push-to-talk communication device to a Presence server of said Internet Protocol core network;

defining and employing an event package, for said push-to-talk communication device, including said operating mode; and sending a Session Initiation Protocol Publish message containing a representation of said manual-answer mode from said push-to-talk communication device to said Internet Protocol core network.

16. The method of claim 15 further comprising:

routing said Session Initiation Protocol Publish message by said Internet Protocol core network to said Presence server;

sending a Session Initiation Protocol Notify message containing a representation of said manual-answer mode from said Presence server to said Internet Protocol core network;

routing said Session Initiation Protocol Notify message by said Internet Protocol core network to said Internet Protocol push-to-talk network server; and setting a state of said push-to-talk communication device to said manual-answer mode at said Internet Protocol push-to-talk network server.

17. The method of claim 15 further comprising:

routing said Session Initiation Protocol Publish message by said Internet Protocol core network to said Internet Protocol push-to-talk network server; and setting a state of said push-to-talk communication device to said manual-answer mode at said Internet Protocol push-to-talk network server.

* * * * *